Jan. 11, 1927.
A. TOTTEREAU
1,614,051
CAR FOR ROUNDABOUTS
Filed July 3, 1924    2 Sheets-Sheet 1
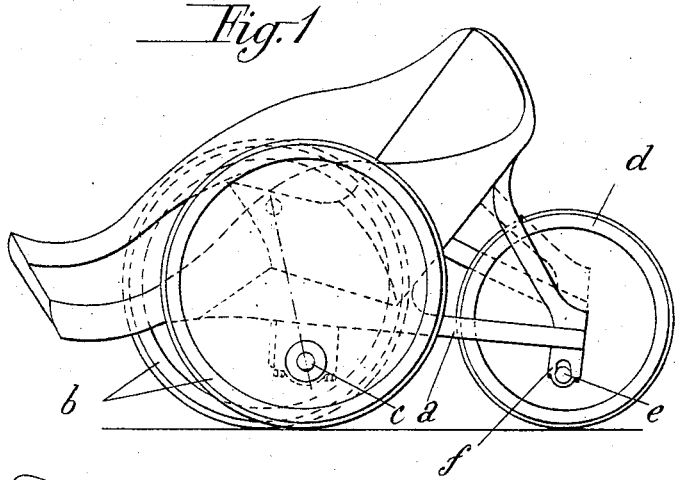
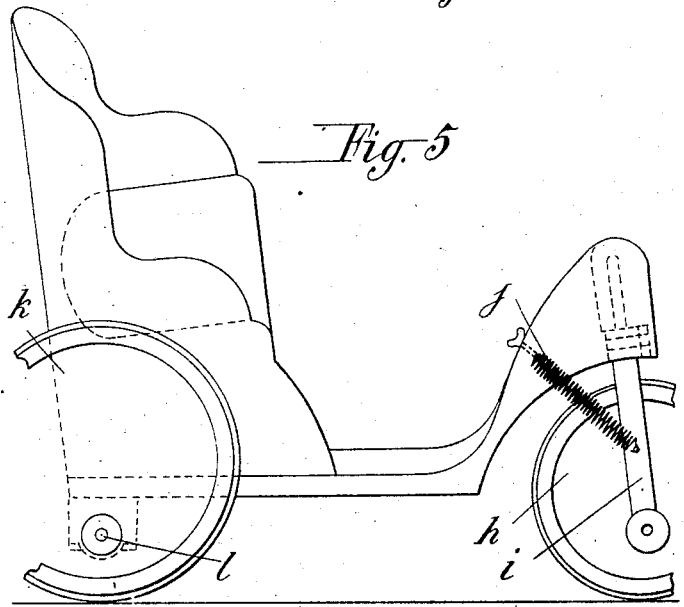

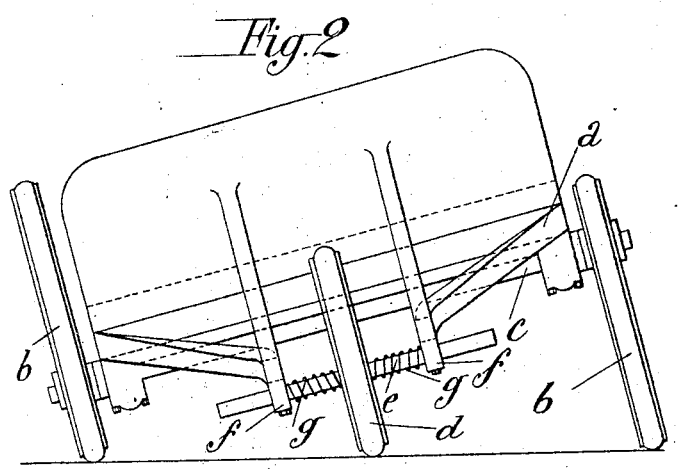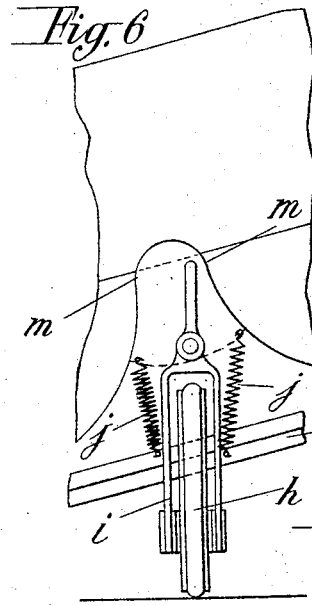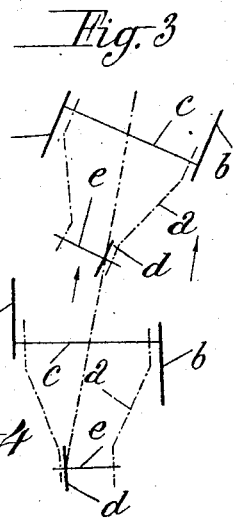

Patented Jan. 11, 1927.

1,614,051

UNITED STATES PATENT OFFICE.

ANDRÉ TOTTEREAU, OF PARIS, FRANCE.

CAR FOR ROUNDABOUTS.

Application filed July 3, 1924, Serial No. 723,965, and in France July 27, 1923.

This invention relates to a car for roundabouts characterized by the use of eccentric wheels designed to produce multiple movements forming a special attraction for the roundabout.

An embodiment of the invention is shown by way of example on the accompanying drawing, in which:—

Fig. 1 shows in side elevation a car in the preferred form of construction.

Fig. 2 shows in rear view the car shown in Fig. 1.

Figs. 3 and 4 are diagrams in plan view.

Fig. 5 shows in side elevation a second form of construction of the car.

Fig. 6 is a part rear view of Fig. 5.

The characteristic features of the invention is the use of the eccentric wheel for cars for roundabouts.

Referring to Figs. 1-4 the car $a$ has two large front wheels $b, b$ keyed on the axle $c$ and one single rear wheel $d$, preferably smaller than the front wheels. The two front wheels are keyed on the axle so that their eccentricity is in opposite directions. The car, being drawn along by a convenient mechanical movement, the results from the opposite directions of eccentricity of the front wheels are:—

(1) An ascending and descending movement of either side of the car at each rotation of the wheels;

(2) A shifting of the front end of the car in lateral direction producing a pivoting movement of the same in horizontal plane owing to the fact that the one wheel rotates with the maximum development, the other wheel turning with the minimum development and inversely. This movement or shifting in lateral direction is maximum when the radius of eccentricity of the wheels is parallel to the ground, the axles being at this moment parallel to the ground. This movement of shifting in lateral direction is illustrated in the diagram Figs. 3 and 4 in which the course of movement is supposed to be developed in straight line.

The rear wheel $d$ is keyed on its axle on which it is also eccentrically mounted. This axle $e$ is mounted in two journals $f, f$ which permit of the wheel turning around itself and sliding in longitudinal direction. Owing to the movement of the front axle with regard to the ground at every semi-revolution of the front wheels one sliding movement of the rear axle $e$ in its journals will occur, this sliding movement being facilitated by the inclination of the entire carriage frame and stopped by compression springs $g, g$ on the rear axle $e$ and designed to soften the shock.

The rear wheel $d$ being of shorter diameter than the front wheels the swinging movement from the front to the rear is different at every revolution whereby the peculiar effect produced is further increased.

In the form of construction shown in Figs. 5 and 6 the small wheel $h$ is the front wheel and it is supported by a pivotal fork $i$ maintained in position by the tension of two springs $j, j$. The pivoting movement of the car in lateral directions due to the eccentricity of the two large wheels $k, k$, keyed on the rear axle $l$, produces a corresponding inclination of the front wheel with regard to the frame, said inclination being checked by the springs $j, j$. Two stops $m, m$ are provided to prevent, in case of breakage of the springs, the total swinging or rocking of the fork.

The invention has for its object mainly the application of the eccentric wheel on the cars for roundabouts. The drawing along of the cars which together form a roundabout is effected by any convenient mechanical means attached at a suitable point of each car at the centre of the axle which carries two wheels, this point being the only point of the apparatus which has a constant position. These arrangements of the roundabout have however to do with the invention.

The construction of the cars might be different from the description as stated above, always provided that the eccentric wheel be used; for instance the two wheels may be fixed on their common axle so that their eccentricity is of the same direction whereby a very irregular raising and rocking will be communicated to the car, independent of the position of the single wheel with regard to the two fixed wheels.

This system of eccentric wheels could be applied also to roundabouts with bicycles.

I claim:—

A car for roundabouts comprising in combination a front axle, two eccentric wheels keyed on said front axle the eccentricity of said two wheels being of opposite directions, an axle at the rear, one small eccentric wheel mounted on said rear axle, journals in which said rear axle can slide in longitudinal direction, and springs on said rear axle for limiting and softening the lateral movements of said rear wheel.

In testimony whereof I affix my signature.

ANDRÉ TOTTEREAU.